United States Patent [19]

Schodl

[11] 3,941,477
[45] Mar. 2, 1976

[54] MEASURING DEVICE FOR THE MEASUREMENT OF FLUID FLOW RATES

[75] Inventor: Richard Schodl, Proz-Urbach, Germany

[73] Assignee: Deutsche Forschungs-und Versuchsanstalt fur Luft-und Raumfahrt E.V., Porz-Wahn, Germany

[22] Filed: Nov. 25, 1974

[21] Appl. No.: 527,077

[52] U.S. Cl. ............................. 356/28; 356/104
[51] Int. Cl.² ................. G01N 21/30; G01P 3/36
[58] Field of Search ....... 356/103, 104, 28; 324/175

[56] References Cited
UNITED STATES PATENTS

| | | | |
|---|---|---|---|
| 3,532,427 | 10/1970 | Paine | 356/28 |
| 3,799,671 | 3/1974 | Schweizer | 356/114 |
| 3,866,055 | 2/1975 | Pike | 356/28 |

*Primary Examiner*—Robert Segal
*Attorney, Agent, or Firm*—Diller, Brown, Ramik & Wight

[57] ABSTRACT

This disclosure relates to an apparatus for measuring flow rates in gas streams and includes an optic component and an electronic component. The optic component starts with a focussed laser beam which is passed through a beam splitting prism so as to define two partial beams which, in turn, pass through a lens system so as to have two adjacent remote focal points. Particles in the gas stream passing through the focal points, which are located therein, reflect light in the form of reflected light beams which pass through a further lens system to pulse generators which, when actuated, generate a start pulse and a stop pulse with these pulses controlling the formation of a saw toothed wave controlling the amplitude of the generated wave, and the generated wave being directed to binary converter means and collector means which, in conjunction with an oscilliscope provides a visual wave having an amplitude indicative of a flow rate. The beam splitter is rotatable so as to selectively position one of the focal points within the gas stream with respect to the other so as to obtain a directional vector of the flowing gases.

14 Claims, 8 Drawing Figures

MEASURING DEVICE FOR THE MEASUREMENT OF FLUID FLOW RATES

The invention relates to a measuring device for the measurement of fluid flow rates by ascertaining the rate of optically determinable particles present in the fluid flow utilizing a light source emitting a focussed beam to a beam splitter together with a lens system arranged in the light path from the beam splitter, which lens system focusses two partial rays, generated in the ray divider or beam splitter, in the fluid being measured at closely adjacent sites, and a photoelectric converter receiving signals via a second lens system from the fluid being measured.

For the measurement of flow rates in gas streams one preponderantly has to have recourse to probes projecting into the flowing gas stream to be tested. These probes may considerably influence the flow gas stream itself and, as a consequence thereof, the value to be measured. Furthermore, there are zones of flow e.g. in the field of turbo-machines, which cannot be covered generally by measuring techniques with probes.

Therefore, there have been developed non-contact operating optical measurement processes based on the fact that each real fluid contains dust particles generally following very strictly the flowing gas current. If these particles are irradiated by a light source, they emit scattered light to all directions. If particles sized between about 0.1 and 1 $\mu$ are irradiated with a laser beam, the light intensity scattering in the direction of the incident laser beam, i.e., the forward radiation, is preponderant by far to the intensity scattered in the opposite direction, i.e., the backward radiation. The ratio of intensity is in the range of $10^2$.

In a known process for optical measurement of the flow rate of gases which is generally designated as "Laser-Doppler Method" a laser beam is directed to a prism and decomposed into two parallel partial beams. The two partial beams are focussed by a collector lens, the focal point of which is in the flow channel, so that an overlapping takes place. There is formed in the overlapping region an interference striated pattern, the bright and dark areas of which extend parallel relative to the angle bisector of the two partial rays and vertical relative to the plane of the partial rays. If a particle present in the gas current passes through this striant system, it is alternatingly illuminated or dark. A photomultiplier directed to the measuring volume, records an approximately sine-shaped signal path the maxima of which are due to the bright bands and the minima of which are due to the dark bands. The signal frequency in association with a known width of bands gives a measure of the velocity component of the particle at right angles to the striated system. The electronic evaluation of the signals is difficult and requires primarily equipment particularly developed for this problem. With this equipment the resolution of frequency is, however, limited to about 50 MHz as an upper limit.

The "Laser-Doppler Method" also involves the disadvantage of a difficult evaluation of the signals and an additional further disadvantage of equal importance with respect to the measurement of high flow rates in narrow flow channels. The reason for this is the aforementioned limited frequency resolution of the evaluation electronics of about 50 MHz maximum. To keep within this limit, the width of the bands in the fluid being measured must be very great for the measurement of high speeds. As a result thereof, the measured volumina have a diameter in the order of millimeters and the intensity distribution is nearly constant in the ambiency of the fluid being measured in the direction of the axis of rays. In the case of measurement in narrow flow channels, the scattered radiation occurring at the channel walls can only be imperfectly eliminated by the scanning optics, so that measurements in turbo-machines for constructional reasons are nearly impossible near the wall due to the backward scattering of the rays.

Another optical measuring process known as "Laser Dual Beam Method" also operates with a laser beam split off in a prism into two partial beams. These partial beams do not go in parallel, but are guided, while they partly overlap, to two closely adjacent focussing points in the flow channel. A particle passing in the flow stream through the focussing points, causes two shortly spaced consecutive scattered light pulses which are recorded by a photomultiplier via collector optics. The time distance between the two pulses is a measure for the flow rate.

Since in this method, only such particles which effect evaluable pulse pairs are those which pass through both of the focussing points. There is recorded only such particle flow directions which extend in direction of an imaginary straight line passing through the two focussing points. Thus, this method is suitable to find the amount and direction of the average flow rate. However, with the test sets of this type measurements are only possible with a low flow tendency (< 10 percent).

In view of the foregoing, it is an object of this invention to provide as a further development of one of the two aforementioned processes a measuring device permitting speed measurements in the region of rotors of turbo-machines. In this connection, the following particular difficulties must be considered:

1. High flow rates up to ~ 400 m/sec.
2. Narrow flow channels (about 10 to 20 mm in direction of the optical axis).
3. For constructional reasons, only the energy-poor backward scattering at the dust particles can be utilized.
4. Due to partly bidimensionally curved casing walls, only windows with small dimensions can be utilized.

To solve this problem, it is proposed, according to the invention, that the direction of an straight line passing through the two focussing points be changeable by rotating the beam splitter, and that the optical magnifier system be so devised that both the focussing points are separately imaged on different photoelectric converters and that there is provided in the ray path of the focussing system a diaphragm rotatable simultaneously with the rotation of the beam splitter.

In accordance with the invention it is possible to change the position of the dot-like focussing points or at least the position of one focussing point so that the direction of the straight line passing through the two focussing points can be changed in the flow channel. Thus, there is also changed the the direction to which the flow measuring devices respond, because an evaluation only takes place with respect to the particles which pass through both of the focussing points. The electronic evaluation of the signals of the photoelectric converter is extremely simple as compared to the known processes. Each of the two focussing points being coordinated to a separate photoelectric converter, a starting-stopping principle can be used in which the converter coordinated to the first focussing point generates a start signal, while the converter coordinated to the second focussing point generates an appertaining stop signal. The speed measurement of the particles in the flow channel is obtained from a time measurement whose result is available as a pulse length. Pulse lengths may be processed and evaluated much more easily with current electronic equipment than different frequencies.

For measurements within the region of high flow rates, the beam distance, i.e., the distance between the two focussing points can be increased in the measuring device of the invention in order to ensure that the generated pulses are sufficiently long for the evaluation electronics.

By a simultaneous adjustment or rotation of the beam splitter and diaphragm, it is easily possible to determine at any point of the flow volume not only the speed vector but also the amount of flow rate. For a laminar flow only a few measurements will be required for the determination of the speed vector. For a turbulent flow, a few measurements will not be sufficient because the speed vector varies not only as to its amount but also as to direction. For the accurate analysis of the tubulent flow a great number of individual measurements is necessary. It would be appropriate to change in eight to ten steps in the region of the average current direction the adjustment angle $\alpha$ of the beam splitter and to make up to a thousand measurements for each angle position. As will be explained hereinafter, said measurements can be made in a few minutes and can be combined electronically to form a distribution curve.

As an advantageous aspect of the invention, there is provided between the ray divider and the lens system an obliquely positioned apertured mirror through the aperture of which the partial rays are directed to a test fluid volume and the mirror surface of which reflects the scattered rays coming from the test volume to the second lens system.

With this arrangement, the scattered rays of the particles in backward direction are utilized. On account of the small length extension of the focussing points and of the strong focussing of the observation optics, the influence of background radiation is eliminated to a great extent. In spite of the low intensity of the backward radiation, it is possible to measure in close vicinity to walls, etc. and to obtain a relatively favorable signal to noise ratio.

The first lens system positioned between the beam splitter and the test volume may be used not only for the focussing of the partial beams directed to the test volume, but also for the focussing of the partial rays emitted from particles in the test volume so that a double function can be achieved.

It is advantageous for the diaphragm to be designed as a rotary dual hole diaphragm having an axis of rotation in which there is one hole while a second aperture is arranged eccentrically. With such a dual hole diaphragm, the beam splitter used conveniently is a Rochon prism generating a partial beam having an axis which is an extension of the axis of the incident beam while the second partial ray is in offset parallel relation thereto. Not only with the apertured diaphragm, but also with the beam splitter, irrespective of the angle of rotation position, there exists a continuous partial beam about which the other partial beam is circulating during a rotation. In each case the apertured diaphragm must be so rotated that it is exactly set relative to the corresponding focussing point via the second lens system and, if necessary, the apertured mirrow. By utilizing a microscope objective in advance of the dual hole diaphragm, the two beams actually lying closely side by side are sufficiently spaced to obtain acceptable hole distances at the dual hole diaphragm. Moreover, the eccentric partial beam is deviated at an angle to the adjacent partial beam.

The measuring device of the invention for which an apertured mirror can be used is advantageous over comparable measuring devices in that all of the components are housed in a compact housing where they are adjustable so that a compact device is available in which the components of the light receiving part are already adjusted to the components to the light emitting part or to the measuring point outside the device. A further advantage of the paths of ray obtainable with the apertured mirror resides in the fact that in the flow channel to which the measuring device is applied from the outside, one must have only a relatively small window for the light transmission. This is important because the windows for the obtention of a light passage must be absolutely plane. Larger windows would require stronger sealing beads and the like which have an influence on the fluid flow.

To evaluate the scattered light pulses emitted by the flowing particles, there is provided in an advantageous embodiment of the invention, a photoelectric converter, which is coordinated to the first focussing point in the test fluid volume, is connected with a first pulse former generating a start pulse, and a photoelectric converter, which is coordinated to the second focussing point, is connected to a second pulse former generating a stop pulse, and that the pulse former generating a stop pulse, and that the pulse formers are connected with a time pulse height converter the output pulses of which, as to their amplitude, always correspond to the time between a start pulse and a corresponding stop pulse.

The conversion of pulse lengths into pulse heights is no problem in electronics and is possible, in a conventional manner, utilizing a conventional saw-tooth generator. The pulse height signals, the amplitude of which corresponds to the time of passage of a particle from the first focussing point to the second focussing point, are evaluable with other known electronic instruments, designated as analyzers, without any difficulties. Such an analyzer comprises a series of amplitude filters (digital filters) all of which are triggered by amplitude-modulated input pulses and among which the filter responds in the region of which the pulse height for which the filter is designed. The filters can be followed by counters (integrators), which count the number of activations of each filter and which store the count for a specific time interval.

The invention is particularly suitable for flow measurements in running turbo machines. To this end, there is conveniently provided a blocking device interrupting the ray of light and being released only at a short time by a trigger signal, the trigger signals being derived from a signal generator controlled by the rotor of the turbo-machine. While the particles hit by the laser beam only emit relatively weak reflection signals, the blade causes a considerably stronger light reflection, whereby the photodetectors, which must be highly sensitive, can be overcharged. The blocking device ensures that a ray of light is only emitted if no blade reflections are to be expected. Due to the blocking device provided in the ray of light, an involved overload protection at the photoreflectors which have to respond extremely quickly is avoided and the occurrence of spurious signals by the reflection from the blades is prevented. A suitable blocking device is for instance a Pockels cell. The opening time of the Pockels cell is selected as small as to ensure that the measurement takes place in a narrow-spaced area of the flow channel or quasi stationarily.

With the above and other objects in view that will hereinafter appear, the nature of the invention will be more clearly understood by reference to the following detailed description, the appended claims and the several views illustrated in the accompanying drawings:

Figure 1:
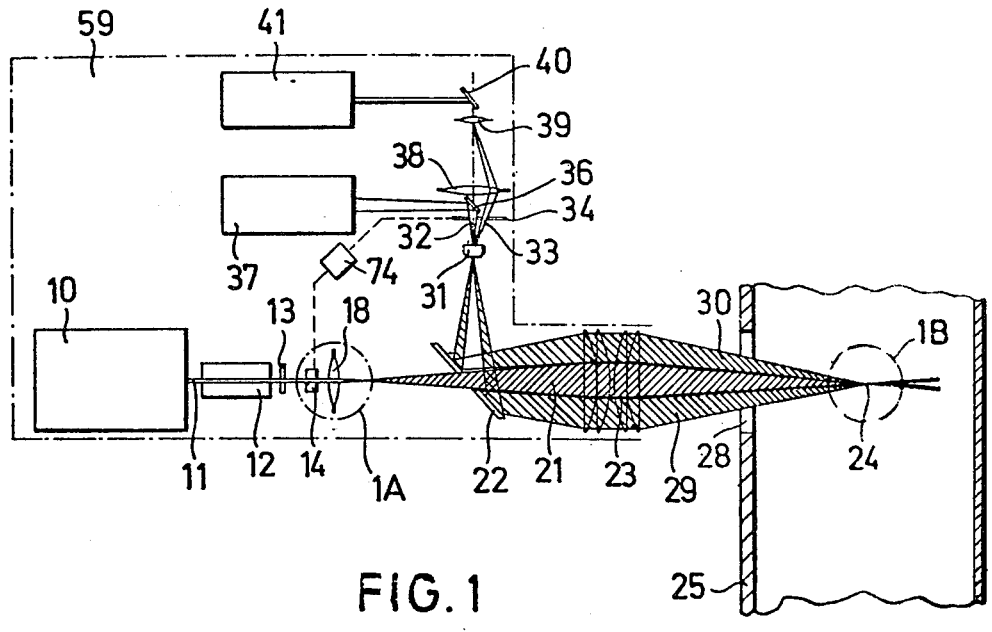
FIG. 1 is a schematic view of the mechanical construction of a measuring device according to the invention.

With reference to the drawings, it will be seen from FIG. 1 that there is used a laser producer 10 to provide a light source, which, in a conventional manner, emits a sharply focussed beam 11 of monochromatic light. Beam 11 travels through trigger optics or blocking device 12, containing, for example, a Pockels cell. Trigger optics are conventionally switched to a great extent free of inertia by electrical signals. They are capable of selectively interrupting beam 11 and letting it pass for a specific determined time upon receipt of a trigger signal. Behind the trigger optics 12, there is a l/4-plate 13 and behind it, there is provided in the conventionally beam path a Rochon prism 14. The l/4 plate causes a circular polarisation of the beam so that with the rotation of the Rochon prism both of the rays emitting from the prism 14 have a constant intensity.

Figure 1A:
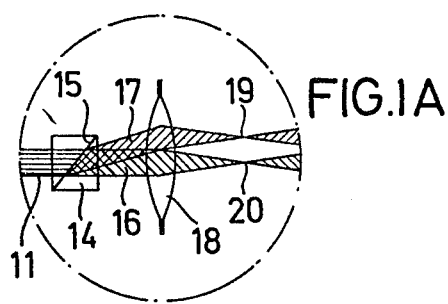
FIGS. 1A and 1B are enlarged schematic views of ray paths in the encircles areas 1A and 1B of FIG. 1.
Figure 1B:
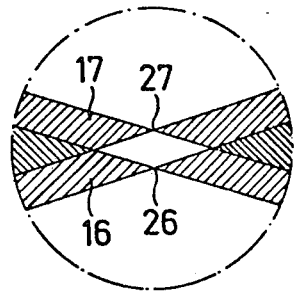

The Rochon prism 14 is shown in enlarged detail in FIG. 1A. It is cube shaped and acts as a beam splitter with the light beam 11 intercepting the cube on one side thereof at right angles. The interface 15 between the two prism halves, as shown in FIG. 1B, is a diagonal of the cube.

The Rochon prism 14 acts as a beam splitter. It generates two partial beams 16, 17 of which the one partial beam 16 is an extension of the incident beam 11, while the other partial beam 17 extends under an angle of refraction with respect thereto.

By a collector lens 18 provided in the light paths behind the Rochon prism, the two partial beams 16, 17 are focussed. The axes of rays of the partial beams 16, 17 cross at focal points 19, 20 while the beams 16, 17 leave the lens 18 in parallel direction with respect to each other with the beams 16, 17 being focussed by the lens 18 in their second focal plane at the respective focal points 19 and 20.

The two partial beams 16, 17, which in their entirety are shown in FIG. 1 within the shaded area 21, pass through a central aperture of an apertured mirror 22 and are transferred by a lens system 23 of great focal length to the actual fluid test volume 24 in a flow channel 25. Here, the partial rays 16 and 17 are focussed again at focussing points 26 and 27.

The focussing points 26 and 27 form a light barrier. If a particle in the flow of the fluid test volume passes through one of the focussing points 26, 27, it is momentarily illuminated and emits in turn a scattered light pulse. If such a particle flies through both of the focussing points 26, 27, it generates two scattered light pulses consecutively in time. From the time sequence of these light pulses (at 300 m/s about 2 $\mu$s), there ensues directly the speed component of the fluid flow in the direction of the imaginary straight line through the focussing points 26 and 27. This straight line is at right angles relative to the axis of the partial rays 16, 17.

A photodetector directed to the test volume 24 is recording the double light pulses only where the level, in which the two partial rays are present, is in parallel relative to the flow direction. Thus, by the determination of the position of the plane, the direction of the particle speed can also be found. The angle resolution is subject to the ratio (ray diameter: ray distance) and is with a 7$\mu$ diameter and a 350 $\mu$ distance about ± 1°.

To admit the light into the flow channel 25, the flow channel 26 is fitted with a planar light-transmissive window 28.

Through the window 28 the scattered light generated by a particle at the focussing points 26 and 27 travels to the outside in the form of partial beams 29 and 30. The partial beams 29, 30 pass the first lens system 23, the diameter of which is so dimensioned that, in addition to the forward-funning beams 16, 17 after passing through the aperture of the apertured mirror 22 pass therethrough, the backward moving partial beams 29, 30 are also transferred therethrough in reverse direction and outside the central region of the lens system with the same lens characteristics.

Partial beams 29 and 30 meet the mirror surface of the apertured mirror 22 inclined about 45° relative to the ray axis and they are focussed on a second lens system 31, conveniently a microscope objective, which is in the focal point of the first lens system 23.

Behind the microscope objective 31, the partial beams 29, 30 are separated again. Partial beam 32, emanating from the focussing point 26 leaves the microscope objective 31 in a coaxial direction, while a partial beam 33 emanating from the focussing point 27 leaves the microscope objective 31 at an angle relative to the axis of the microscope objective.

Behind the microscope objective 31, there is a dual hole diaphragm 34 containing a central aperture for beam 32 and an eccentric hole for the passage of beam 33.

Behind the central aperture of the dual hole diaphragm 34 there is an oblique mirror 36 deviating partial beam 32 at a right angle relative to the axis of the microscope objective 31 and guiding it to a conventional photoelectric (light/voltage) converter 37, e.g., a photomultiplier.

The oblique mirror 36 is so small that it does not cover the second partial beam 33, which passes by the mirror 36 and meets a collector lens 38. Behind the lens 38, there is a further lens 39 in the path of the beam 33 and behind it, there is a further oblique mirror 40 conducting the partial beam 33 to a further conventional photoelectric (light/voltage) converter 41.

The convention light/voltage converter 37 generates an electric start pulse while the conventional light/voltage converter 41 generates an electric stop pulse. The time difference between the two pulses is used to calculate the fluid flow rate.

Figure 2:
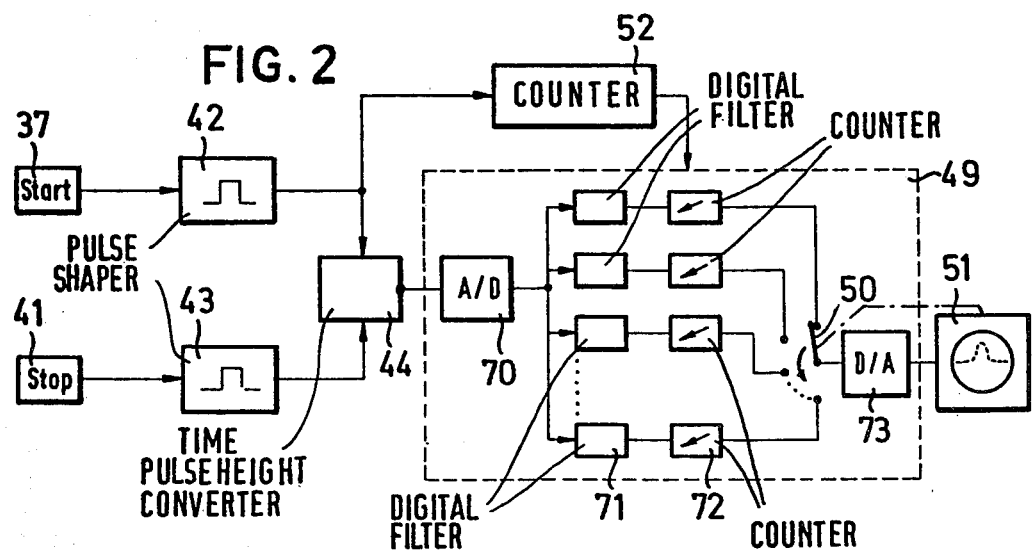
FIG. 2 is a block circuit diagram of the evaluation electronics connected to the photoelectric converter.

The means for effecting the evaluation and processing of the start pulse and the stop pulse, according to the invention is illustrated in FIG. 2 in the form of a block diagram.

At the output of the converter 37 for the start pulse, there is connected a conventional pulse shaper 42, which upon receipt of an input pulse, generates an output pulse of a defined amplitude and form shown as a square wave pulse.

Also, after the photoelectric converter 41 for the stop pulses, there is provided a conventional pulse shaper 43 of the same type as the pulse shaper 42, which also produces an output pulse of a definite amplitude and form, as shown on a square wave pulse.

Figure 3:
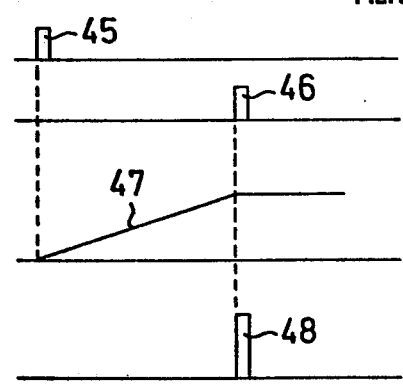
FIG. 3 is a schematic view of the pulse extensions in the evaluation electronics relative to a time axis.

The outputs of the two pulse shapers 42 and 43 are fed to the input of a conventional time/pulse height converter 44. The time pulse height-converter 44 generates an output pulse, the pulse height of which is dictated by the time period between the pulses from the pulse shapers 42 and 43. The mode of operation of the time/pulse height converter 44 is illustrated with the pulse diagram of FIG. 3 where the different relevant voltages are shown as functions of time. A start pulse 45 from the pulse shaper 42 enables the converter 44 which starts to produce a voltage 47 which, like a ramp function, increases linearly over a period of time. A stop pulse 46 from the pulse shaper 43 carries the converter 44 to limit the increase of voltage 47 and to maintain it at a constant value determined by the period between the start and stop pulses. An output pulse 48 supplied thereafter from the time/pulse-height converter 44 has the amplitude of the obtained constant value voltage 47. It is the greater the greater the time interval between the pulses 45 and 46. If a start pulse 45 is generated, but no stop pulse 46 follows thereafter within a specific period of time, the voltage 47, upon reaching its maximum value, is again automatically returned to zero reference level.

The output pulse 48 is fed to the input of a conventional analog/digital-converter 70, which converts the pulse height into binary-coded signals. In a practical execution, a specific region of amplitudes which is adjustable, is resolved in ten bits so that the amplitude region is resolved into 1024 increments. The ten bits, representing amplitude values, are passed on to respective digital filters 71 of which 1024 exist, and of which each corresponds to a specific amplitude value or amplitude interval. The digital filters 71 are conventional digital filters (pulse filters) delivering output pulses with standard amplitude and standard length, if the amplitude of the input pulse 48 is in the amplitude interval to which responds the corresponding filter 71. The signal output from all the filters 71 which are representative of respecting amplitude regions, cover all of the amplitudes of the pulse 48 of interest without a mutual overlapping.

After each filter 71 there is provided a counter (integrator) 72, the counter level of which always shows the sum of the pulses fed via the appertaining gate circuit 71. The counters 72 form the "memory" of each amplitude channel. The outputs of the counters 72 can be scanned in cycles and to simplify matters, this is shown as a symbol by switch 50 in the drawing. In practice, the cyclic scanning of the individual channels is achieved electronically in a conventional manner. The counter levels are transferred either in series or in parallel to a conventional digital/analog converter 73, converting the counter levels into voltage amplitudes.

The digital/analog-converter 73 can be connected with an oscilloscope 51 whose X-voltage is synchronised with the movement of switch lever 50, a feature illustrated diagrammatically by a dash-dot line connected between the switch 50 and the oscilloscope 51. The Y-deflecting voltage is taken from the ouput of the digital/analog converter 73, which corresponds to the output of the counters 72. In this manner there is obtained an oscillogram of a distribution curve consisting of dots. The number of dots corresponds to the number of channels of the analyser 49. In place of the oscilloscope 51, there can be also used a mechanical recorder or a computer connected to the analyser 49.

The aforementioned analyser 49 operates digitally. Of course, it is also possible, to use other analysers within the scope of the invention. Above all, use can be made of merely analogously operating conventional analysers in which the amplitude filtering function is effected by conventional differential amplifiers.

In the condition of the optical system illustrated in FIG. 1, in which the straight line passing through the focussing points 26 and 27 extends parallel relative to the axis of the flow channel 25, the amplitude of the flow rate can be easily ascertained with a laminar flow. The peculiarity of the device according to the invention resides in the fact that flows with other vectors can be simply ascertained. Rotating, for this purpose, the Rochon prism 14 about the axis of the incident ray 11, the focussing point 20 of the transmissive ray portion remains fixed while the focussing point 19 rotates also about the focussing point 20. The straight line passing through both the focussing points 19, 20 extends now at an angle relative to the axis of the flow channel 25. The photoelectric converters 37 and 41 being optically oriented to the focussing points, the optical alignment of at least one converter must change if the position of one focussing point has changed. Therefore, the dual hole diaphragm 34 can be rotated simultaneously with the Rochon prism 14. The rotational movements of these two elements can be synchronised via a mechanical coupling 74, FIG. 1. To simplify matters, it is also possible to manually rotate through the same angle both the prism 14 and the diaphragm 34.

Figure 4:
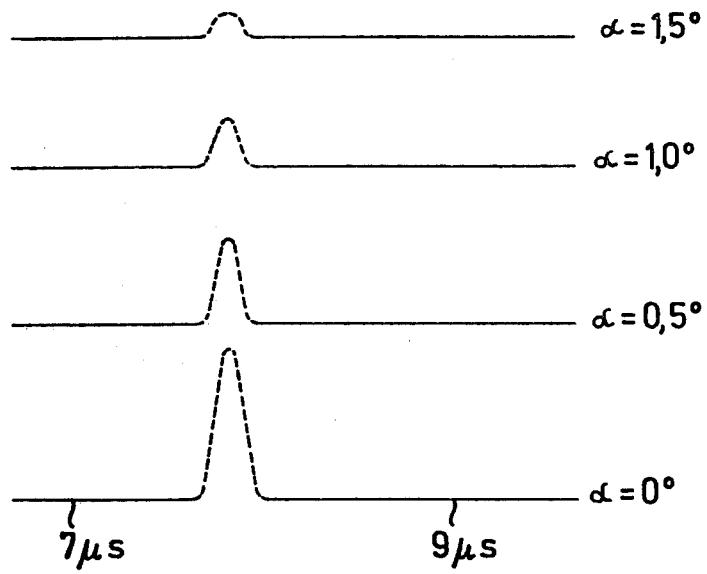
FIG. 4 shows oscillograms of the frequency distributions of speed at a measuring point at various test angles with respect to the average flow direction.

In FIG. 4, the analysis of a current is illustrated with different angles of rotation $\alpha$, such as visible on th screen of the oscilloscope 51 (FIG. 2). Conveniently, the angle position $\alpha$ of the plane of the two partial rays 16, 17 is changed within the region of the central flow direction in eight to ten steps, and up to 1000 measurements are made with each angle position $\alpha$. The number of measurements is recorded by counting the number of start pulses in a counter 52 which counter is connected to the pulse shaper 42 and responsive to its output, and after a thousand measurements, that is a thousand pulses from the pulse shaper 42, the counter 52 produces an output pulse which is fed to the analyser 49, causing the analyser to be switched off.

In FIG. 4, the time is marked on the abscissa, which time is required by the particles to pass the distance between the focussing points 26 and 27 in the test volume. The ordinate indicates the frequency of the time event concerned. For each distribution, the same number of starting events, i.e., particles entering the test volume, have been taken as a basis.

The probability that a particle that entered the test volume, will meet both of the focussing points 26, 27 is greatest of all in the direction of the average fluid flow sense ($\alpha = 0°$). The maximum of distribution indicates the average speed, while the breadth of distribution at the foot corresponds to the greatest fluctuations of speed.

With increasing angle $\alpha$, the probability for a particle to pass through focussing points 26, 27 declines quickly, as expected, and in case of $\alpha = 1.5°$ it is already nearly 0. Due to the symmetry of the event there are obtained equal distributions with the correspoding negative values of $\alpha$. By combinations there are obtained distributions of frequencies subject to the speed or to the appertaining time and the direction of speed.

For the performance of 8,000 to 10,000 individual measurements to analyse turbulent flows, about 3 to 4 minutes are required including the output of data subject to the pollution of the flow medium. To obtain correct measurements, the flow conditions at the point of measurement must remain unchanged in the average during this time.

Figure 5:
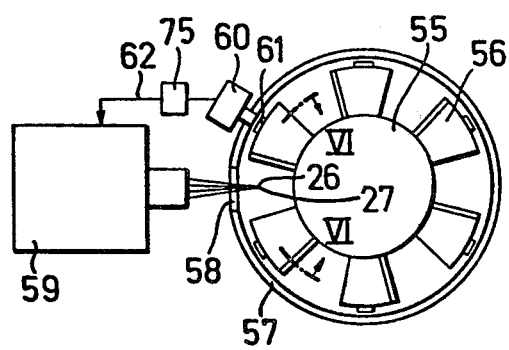
FIG. 5 shows a schematic view of the connection of the measuring device of FIG. 1 to the casing of an axial condenser for making measurements within the operating condenser.

A particular advantage of the device of the invention resides in the fact that it is excellently suitable for the measurement in running turbo-machines. The measuring principle is schematically shown in FIG. 5. The flow distribution in an axial condenser shall be measured. The shaft of the axial condenser is referred to with 55. The blades 56 are radially projecting therefrom and are oblique in axial direction. In the wall 57 of the axial condenser there is a plane window 58 to which the device 59 shown in FIG. 1 is attached.

The wheel flow recognised by a stationary observer being unstationary, there is provided a trigger unit taking care that the flow measurements are performed as a kind of dot scanning in the region between the blades 56, the measurements always being made at the same point in consecutive blade periods. By this means, there is obtained a quasi-stationary measuring event.

The triggering is made with a conventional contactless (proximity) switch 60 which is mounted on the casing wall of the axial condenser and racts on the blades 56 or on the marks 61 at the blades. The marks can be magnetic strips. Whenever a blade 56 passes by switch 60, it gives a short pulse via line 62 to the trigger optics 12 (FIG. 1), they admit the passage of ray 11 during the pulse, while it is blocked for the rest of the time. Between switch 60 and trigger optics 12, a conventional adjustable electric delay member 75 can be fitted. Thus, it is possible to perform between two blades 56 measurements in a dot-like manner and to scan the same measuring points cyclically between all of the blade pairs passing by.

By rotation of the Rochon prism 14 and of the dual hole diaphragm 34, flow vectors can be determined at all of the points between the blades 56.

Figure 6:
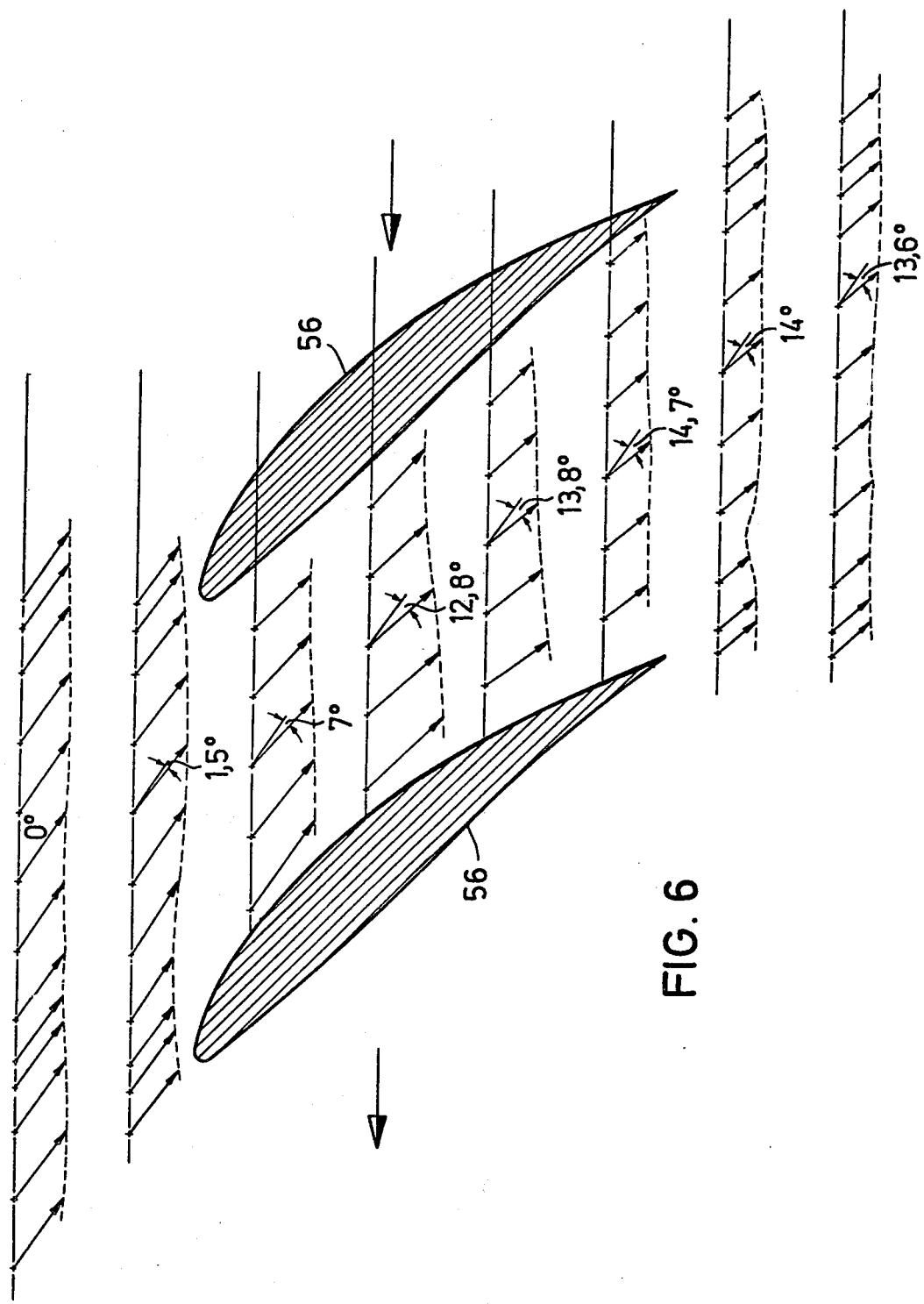
FIG. 6 is an enlarged schematic sectional view along line VI—VI of FIG. 5 and showing marked flow vectors.

FIG. 6 shows an example of the flow distribution between two blades 56 of an axial condenser. The space between the blades is resolved into 5 measuring points. The main flow directions are applied as to value and angle position. The direction of the inflow is defined with 0°. The change of the direction of main flow between the blades up to a maximum of 14.7° is clearly evident.

By shifting the device 59 radially relative to the rotor 55, the depth can be easily modified in which the measurements are made between the blades.

The test interval is dictated by the blade frequency and by the number of measuring points between two blades. With ten measuring points, the test interval must be less than 1/10 of the blade period, thus with 10 kHz blade frequency less than 10 $\mu s$. The measurement at the selected point of the blade channel is repeated after each wheel rotation until sufficient data for the evaluation is available.

Although it has been stated above that the converters 37, 41; the pulse shapers 42, 43; the time/pulse-height converter 44; the analog/digital-converter 70; the digital filter 71; the counters 52, 62; the switching means 50 and the digital/analog converter 73 are conventional, in order to more fully facilitate the understanding of one not fully conversant with the electronic components of FIG. 2, the following information with respect to these components is provided:

The converters 37, 41 may be photomultipliers of type 9813 A available from EMI Electronic Ltd., 243 Blythroad, Hayes, Middlessex. The pulse shapers 42, 43 may be constant fraction triggers type CFT-D of Canberra Electronic GmbH, Munchen, W. Germany.

The time/pulse-height converter 44 may be model 437A available from ORTEC, 100 Midland Road, Oakridge, Tennessee/USA.

The analyser 49 incl. oscilloscope 51 may be model 8100 "Multi-Channel Analyser" available from Canberra Industries Inc., Meriden, Connecticut, USA.

Counter 52 can be a "preset-counter" type 1776 of Canberra Ind.

Although only a preferred embodiment of the fluid flow measuring apparatus has been specifically illustrated and described herein, it is to be understood that minor variations may be made therein without departing from the spirit and scope of the invention.

What is claimed is:

1. Measuring device for the measurement of flow rates of fluids by determining the rate of movement of optically detectable particles present in the fluid flow, said device comprising a light source means for emitting a focussed beam, a beam splitter for receiving said beam and dividing said beam into two generated partial beams, a first lens system in the path of said partial beams for focussing the two partial beams in a fluid test volume at closely adjacent focussing points, a photoelectric converter system, a second lens system for directing light beams reflecting from particles in the test fluid to said photoelectric converter system, means for rotating said beam splitter to selectively change the direction of an imaginary straight line passing through said two focussing points, said photoelectric converter system including two photoelectric converters, said second lens system having means for imaging light beams reflected from particles at said two focussing points separately on respective ones of said photoelectric converters, said second lens system including a dual hole diaphragm for receiving reflected light beams from said two focussing points, and means for adjusting said diaphragm simultaneously with the rotation of said beam splitter.

2. Measuring device according to claim 1 wherein there is provided between said beam splitter and said first lens system an oblique apertured mirror through the aperture of which the generated partial beams are directed to the fluid test volume and the mirror surface of which reflects the reflected beams coming from the fluid test volume to said second lens system.

3. Measuring device according to claim 2, wherein said dual hole diaphragm is rotatable and is provided coaxial to the axis of rotation thereof with one hole, and there is a second hole positioned eccentrically of said axis.

4. Measuring device according to claim 3, wherein said beam splitter is a Rochon prism capable of generating a first of said generated partial beams having an axis which is an extension of the axis of said focussed beam on a second of said generated partial beams, and a collector lens travels in parallel offset relation to the first generated partial beam.

5. Measuring device according to claim 4, wherein there is a first pulse shaper means for generating a stop pulse, that one of said photoelectric converters coordinated to a first of said focussing points in the test volume is connected with said first pulse shaper means, a second pulse shaper means for generating a stop pulse, said photoelectric converter associated with the other of said focussing points being connected to said second pulse shaper means, and a time/pulse-height converter and means connecting said pulse shapers to said time/pulse-height converter for providing the output pulses which correspond as to their amplitude to the time between a start pulse and a stop pulse.

6. Measuring device according to claim 5, wherein there is a multi-channel analyser containing plural filters with counters, said time/pulse-height converter is connected to said multi-channel analyser, and a scanning device for cyclically scanning said counters.

7. Measuring device according to claim 6, wherein there is a blocking device for interrupting said focussed beam and trigger signal means connected to said blocking means for temporarily releasing the same.

8. Measuring device according to claim 7 wherein said measuring device is utilized in conjunction with a turbo-machine having a rotor, and said trigger signal means includes means actuated in timed relation to the rotation of said rotor.

9. Measuring device according to claim 8 wherein said rotor includes circumferentially spaced blades, and the time release of said blocking device is below 1/n of the blade frequency of said turbo-machine, n being the number of intervals into which the blade division is resolved.

10. Measuring device according to claim 1, wherein said dual hole diaphragm is rotatable and is provided coaxial to the axis of rotation thereof with one hole, and there is a second hole positioned eccentrically of said axis.

11. Measuring device according to claim 10, wherein said beam splitter is a Rochon prism capable of generating a first of said generated partial beams having an axis which is an extension of the axis of said focussed beam on a second of said generated partial beams, and a collector lens travels in parallel offset relation to the first generated partial beam.

12. Measuring device according to claim 1, wherein said beam splitter is a Rochon prism capable of generating a first of said generated partial beams having an axis which is an extension of the axis of said focussed beam on a second of said generated partial beams, and a collector lens travels in parallel offset relation to the first generated partial beam.

13. Measuring device according to claim 1, wherein there is a first pulse shaper means for generating a stop pulse, that one of said photoelectric converters coordinated to a first of said focussing points in the test volume is connected with said first pulse shaper means, a second pulse shaper means for generating a stop pulse, said photoelectric converter associated with the other of said focussing points being connected to said second pulse shaper means, and a time/pulse-height converter and means connecting said pulse shapers to said time/pulse-height converted for providing the output pulses which correspond as to their amplitude to the time between a start pulse and a stop pulse.

14. Measuring device according to claim 13, wherein there is a multi-channel analyser containing plural filters with counters, said time/pulse-height converter is connected to said multi-channel analyser, and a scanning device for cyclically scanning said counters.

* * * * *